(12) United States Patent
Iversen et al.

(10) Patent No.: US 10,428,276 B2
(45) Date of Patent: Oct. 1, 2019

(54) FEED MIXTURE FOR PRODUCING HYDROCARBONS

(71) Applicant: STEEPER ENERGY APS, Hørsholm (DK)

(72) Inventors: Steen Brummerstedt Iversen, Vedbæk (DK); Göran Olofsson, Bunkeflostrand (SE)

(73) Assignee: STEEPER ENERGY APS, Hørsholm (DK)

( * ) Notice: Subject to any disclaimer, the term of this patent is extended or adjusted under 35 U.S.C. 154(b) by 103 days.

(21) Appl. No.: 15/308,979

(22) PCT Filed: May 5, 2015

(86) PCT No.: PCT/DK2015/050113
§ 371 (c)(1),
(2) Date: Nov. 4, 2016

(87) PCT Pub. No.: WO2015/169319
PCT Pub. Date: Nov. 12, 2015

(65) Prior Publication Data
US 2017/0073586 A1    Mar. 16, 2017

(30) Foreign Application Priority Data
May 5, 2014    (DK) .................................. 2014 00245

(51) Int. Cl.
*C10G 1/06*    (2006.01)
*C10B 53/02*    (2006.01)
(Continued)

(52) U.S. Cl.
CPC ................ *C10G 1/06* (2013.01); *C10B 53/02* (2013.01); *C10B 57/06* (2013.01); *C10G 1/008* (2013.01);
(Continued)

(58) Field of Classification Search
CPC ............ C10G 1/06; C10B 53/02; C10B 57/06
See application file for complete search history.

(56) References Cited

U.S. PATENT DOCUMENTS 4,370,238 A * 1/1983 Tackett, Jr. ............ C10G 33/04
208/188
4,935,567 A    6/1990 Yokoyama et al.
(Continued)

FOREIGN PATENT DOCUMENTS

EP    0204354 A1    12/1986
EP    2287279 A1    2/2011
(Continued)

OTHER PUBLICATIONS

Takahashi, M. et al. (2001) Journal of Polymer Science Part B: Polymer Physics, 39(1), 91-100.*
(Continued)

*Primary Examiner* — Brian A McCaig
(74) *Attorney, Agent, or Firm* — Birch, Stewart, Kolasch & Birch, LLP

(57) ABSTRACT

The invention relates to a feed mixture for use in a process for producing hydrocarbons under increased pressure and temperature conditions, where the feed mixture comprises one or more carbonaceous feedstocks and water, where further a texturing agent has been added to the feed mixture, the texturing agent being adapted to stabilize the feed mixture to prevent separation and further to maintain the feed mixture as a homogenous mixture during a pressurization. Further the invention relates to processes for manufacturing such feed mixture.

38 Claims, 3 Drawing Sheets

(51) Int. Cl.
*C10B 57/06* (2006.01)
*C10G 1/00* (2006.01)

(52) U.S. Cl.
CPC ..... *C10G 1/065* (2013.01); *C10G 2300/1007* (2013.01); *C10G 2300/1014* (2013.01); *Y02E 50/14* (2013.01); *Y02P 30/20* (2015.11)

(56) References Cited

U.S. PATENT DOCUMENTS

| | | | |
|---|---|---|---|
| 6,132,478 A | 10/2000 | Tsurui et al. | |
| 7,262,331 B2 | 8/2007 | Van De Beld et al. | |
| 8,378,091 B2 * | 2/2013 | Kaneko | A61L 31/042 536/101 |
| 2008/0312479 A1 | 12/2008 | McCall et al. | |
| 2009/0126274 A1 | 5/2009 | Vogel et al. | |
| 2010/0287825 A1 | 11/2010 | Humphreys | |
| 2012/0247763 A1 * | 10/2012 | Rakitsky | C04B 24/08 166/279 |
| 2013/0055623 A1 * | 3/2013 | Iversen | C10G 1/086 44/385 |
| 2015/0094464 A1 * | 4/2015 | Saxell | C08B 11/12 536/98 |

FOREIGN PATENT DOCUMENTS

| | | | | |
|---|---|---|---|---|
| WO | WO 95/14850 A1 | 6/1995 | | |
| WO | WO 2006/117002 A2 | 11/2006 | | |
| WO | WO 2009/015409 A1 | 2/2009 | | |
| WO | WO 2009/099684 A2 | 8/2009 | | |
| WO | WO 2011/069510 | * 6/2011 | ............... | C10G 1/08 |
| WO | WO 2012/092475 A1 | 7/2012 | | |
| WO | WO 2012/167789 A2 | 12/2012 | | |

OTHER PUBLICATIONS

Hammerschmidt et al., "Catalytic Conversion of Waste Biomass by Hydrothermal Treatment," Fuel, vol. 90, 2011 (published online Oct. 20, 2010), pp. 555-562.

Karagöz et al., "Hydrothermal Upgrading of Biomass: Effect of $K_2CO_3$ Concentration and Biomass/Water Ratio on Products Distribution," Bioresource Technology, vol. 97, 2006 (published online May 5, 2005), pp. 90-98.

Karagöz et al., "Low-Temperature Catalytic Hydrothermal Treatment of Wood Biomass: Analysis of Liquid Products," Chemical Engineering Journal, vol. 108, 2005, pp. 127-137.

Osada et al., "Catalytic Gasification of Wood Biomass in Subcritical and Supercritical Water," Combustion Science and Technology, vol. 178, No. 1, 2006 (published online Jan. 1, 2006), pp. 537-552.

Peterson et al., "Thermochemical Biofuel Production in Hydrothermal Media: A Review of Sub- and Supercritical Water Technologies," Energy and Environmental Science, vol. 1, 2008 (published online Jul. 9, 2008), pp. 32-65.

* cited by examiner

FEED MIXTURE FOR PRODUCING HYDROCARBONS

FIELD OF THE INVENTION

The present invention relates to the field of producing hydrocarbons from carbonaceous materials. In particular, it relates to an improved feed mixture to be used in a process and apparatus for producing hydrocarbons in an efficient, economical and environmentally sustainable way.

BACKGROUND OF THE INVENTION

The world is facing fluctuations in crude oil prices as well as challenges to energy security, economic stability and growth. Further environmental concerns related to climate change due to the 'greenhouse effect' is coming more and more in focus. Furthermore a number of conventional energy sources such as oil are being depleted. This calls for a more efficient and sustainable use of resources, including non-conventional and alternative resources.

Hence, there is a large and increasing global interest in new technologies for the production of liquid hydrocarbons from low value abundant resources such as lignite, peat, biomass, residues and waste. A general characteristic of such low value resources is that they typically have high moisture content, an oxygen content on a dry ash free basis in the range 20-60%, and an ash content ranging from a few percent to more than 50% by weight, which results in a low heating value as received.

Technologies for production nonconventional liquid hydrocarbons are known e.g. production of liquid hydrocarbons from coal has been known for more than 150 years. Pyrolysis or high temperature carbonization is another well known route for production of liquid hydrocarbons from solid fuel. Depending on the specific process the input stream may be heated to a temperature in the range 450 to 1000° C. in the absence of oxygen, driving of the volatile compounds and leaving a coke product. The hydrocarbon yields can be wide varying and ranges from 10 to 75% depending on the volatile content of the specific input streams and process conditions. In general fast heating (fast pyrolysis) and short residence time provides the highest yields. However, pyrolysis is limited to dry input streams e.g. moisture contents up to approximately 10% by weight. Further as only very limited conversion of the liquid hydrocarbon produced occurs during processing, the liquid hydrocarbons produced have a high oxygen and water content, and the liquid hydrocarbons produced consequently have a low heating value. Further, the liquid hydrocarbons are not mixable with petrodiesel and petrocrude, and are corrosive and susceptible to polymerization which makes long term storage difficult. This limits the direct use of such pyrolytic hydrocarbon liquids. Upgrading of pyrolytic hydrocarbons may be performed by hydrodeoxygenation or by addition of hydrogen during the pyrolysis process. However, though such hydrogenation processes are technically feasible, they will add significantly to the production costs as no oxygen is removed by the pyrolysis, and production of hydrogen is relatively expensive.

Indirect liquefaction of coal by first producing a syngas by thermal gasification and subsequent conversion into liquid hydrocarbons by the Fischer-Tropsch route has been practiced by Sasol in South Africa since the 1950's. Shell and ExxonMobil has developed similar technologies for production of liquid hydrocarbons from natural gas. Indirect gasification is characterized by being very capital intensive and having relatively low efficiencies. Typically the energy efficiency for conversion from coal to liquid hydrocarbons is in the range 30-50%.

Production of liquid hydrocarbons by dissolution of coal in a solvent in the presence of high hydrogen pressures and iron catalysts to produce high boiling liquids is known as the Bergius, Pott Broche or I.G. Farben process and was used to produce gasoline during the Second World War Common features are dissolution of a high proportion of coal in a solvent at elevated temperature, followed by hydro-cracking of the dissolved coal with hydrogen and a catalyst. The processes differ in the number of stages, process conditions and specific catalysts applied.

The production of liquid hydrocarbons from feedstock other than coal is also being conducted by the pyrolysis, indirect and direct liquefaction techniques described above. However, common for all of them is that they all require relatively dry input streams. A fundamental issue is difference in the stoichiometry of the input stream and liquid hydrocarbon fuels. For example dry wood may be represented by the formula $CH_{1.4}O_{0.7}$, whereas liquid hydrocarbon fuels may be represented by the formula $CH_2$:

$$CH_{1.4}O_{0.7} \rightarrow CH_2$$

This fundamentally result in an indispensable need for hydrogen addition and/or removal of carbon during the processing for adaption of the H/C ratio and removal of oxygen. Removal of carbon as char and $CO_2$ reduces the maximum obtainable yields of the desired hydrocarbons, whereas production of hydrogen is relatively expensive and adds significantly to the complexity and reduces the efficiency of such processes. Hence to be viable such processes require a very large scale and thereby become very capital intensive (UK DTI, Coal Liquefaction, Cleaner Coal Programme, Technology Status Report 010, October 1999).

Hence, there is a large interest in developing improved production techniques for liquid hydrocarbons not suffering from the drawbacks described above. Conversion of the feedstock in pressurized water at elevated temperatures is a route which has attracted significant attention over recent decades. Such techniques are generally called hydrothermal processing, and generally convert the feedstock into liquid hydrocarbon product, a char product, a water phase comprising water soluble organics, a gas and a mineral product.

An advantage of hydrothermal processing is that water is kept under pressure so that it is maintained in its liquid and/or supercritical state which means that no phase transition into steam occurs during processing. Hence, the energy loss, in the form of latent heat of evaporation, need not be supplied, and thus energy consuming processes such as evaporation or distillation are eliminated. This renders such processes very energy efficient particularly for wet input streams.

Water, in the vicinity of its critical point (374° C., 221 bar) obtains physical properties which are very different from water at ambient conditions e.g. the dissociation product of water is more than three orders of magnitude higher, it changes its polarity from a polar solvent to a non-polar solvent, interphase mass and heat transfer resistances are significantly reduced and mass- and heat transfer rates are therefore enhanced.

Due to these properties of water in the vicinity of its critical point, water may serve both as a reaction medium, a catalyst for acid and base catalyzed reactions and as a reactant and source of hydrogen in the conversion process.

Hence hydrothermal processing holds the potential to reduce the oxygen content of wet oxygenated feedstock with lower parasitic energy losses and with less hydrogen required due to formation of hydrogen in situ.

An excellent review of the state of the art of such hydrothermal processes and characteristic chemical reactions for conversion of organic macromolecules is given in A. Peterson et al, "Thermochemical biofuel production in hydrothermal media: A review of sub- and supercritical water technologies, Energy Environ. Sci., 2008, 1, 32-65.

Deoxygenation goes through dehydration, decarboxylation and hydrogenation reactions. However, the reaction pathways are complex and are to a large extent unknown except for simple molecules. Carbonaceous macromolecules may undergo various reactions including hydrolysis, dehydration, decarboxylation, steam reforming, water gas shift, steam cracking, Bouduard reaction, hydrogenation, methanation, Fischer-Tropsch, aldol condensation, esterification, methanol synthesis etc. The rate of the individual reactions and the extent to which conversion proceeds via specific reaction pathways depends on a number of factors.

Processes differ in the specific operating conditions and process design and layout being applied e.g. the feedstock, the dry solid content in the feed, the ash content of the feed, the operating pressure and temperature, the pH, the catalysts and other additives present in different parts of the process, the residence time in the different parts of the process, the heat integration, the separation techniques applied including further product handling and upgrading etc.

These factors all influence the distribution, yields and quality of the products produced i.e. the amount and quality of liquid hydrocarbons, the amount and quality of char, the amount of organics contained in the water phase, and the amount and quality of gas, and the amount and quality of mineral product. Further they influence the overall efficiency of the process i.e. the parasitic energy loss and overall energy recovery in desired product(s), amount of consumables used, the robustness and complexity the process as well as the overall process economics.

Several hydrothermal conversion processes of biomass and other carbonaceous macromolecules are in the development or demonstration including hydrothermal processes producing char or a solid residue as main product, thermal wet gasification, catalytic gasification and hydrothermal liquefaction to produce liquid hydrocarbons.

Processes for production of coke/char product by supercritical hydrothermal dewatering and/or partly depolymerization have been developed. Examples of hydrothermal processes being commercialized are the Slurycarb process by Enertech (N. L. Dickinson, WO95/014850, www.enertech.com), the K-fuel process by Evergreen Energy (R. F. Hogsett, EP2,287,279, www.evergreen.com), and the JGC Coal Fuel process by JGC Corporation (M. Tsurui et al, U.S. Pat. No. 6,132,478, www.jgc.co.jp/enindex.html). Common to these processes the aim is to produce a partly depolymerized char product as the main product and that they operate at relatively low pressure (50-150 Bar) and temperature (200-300° C.).

Thermal wet gasification aims at producing gas by thermal decomposition without applying a heterogeneous catalyst. Typically such processes operate at temperatures in the range 500-700° C., and pressures above the critical pressure of water. Corrosion is severe at these conditions, and places very high demands on the materials of construction (A. Peterson et al, 2008). Hence, a considerable interest is directed to gasification processes applying a heterogeneous catalyst to decrease the temperature required for said gasification to proceed with reasonable rate and yield (A. Peterson et al, 2008; M. Osada et al, 2006; F. Vogel et al, US2009/0126274; D. C. Elliott et al, WO2009/099684). Catalytic gasification may proceed at operating temperatures in the range 400 to 500° C. However, the use of heterogeneous catalysts requires efficient removal of suspended particles prior to contact with said heterogeneous catalyst to avoid clogging of the reactor (A. Peterson et al, 2008; F. Vogel et al; US2009/0126274; D. C. Elliott et al, WO2009/099684). Progress is being made in this direction (F. Vogel et al; US2009/0126274; D. C. Elliott et al, WO2009/099684) No hydrothermal gasification plant has yet been commercialized (A. Peterson et al, 2008).

Hydrothermal processes for production of liquid hydrocarbons from carbonaceous materials are generally performed at a pressure sufficient to avoid vaporization of the fluid, and at lower temperatures than hydrothermal gasification processes, to maximize yield of liquid hydrocarbon products. Typically the pressure is in the range 40 to 200 bar and the temperature in the range 200 to 370° C. (A. Peterson, 2008). Some of the most significant prior processes are described below.

Shell developed the so-called HTU process for production hydrocarbon containing liquids from biomass (Annee et al, EP 0,204,354). The process converts biomass products such as wood at temperatures in the range 300 to 380° C. and a pressure above the boiling point of water, preferably in the range 150 to 250 bar and residence times from 3 to 10 minutes. No catalyst was used in the process. Heating was performed by a combination of indirect heating and heating by direct steam injection. An oil yield of 30-50% calculated as the ratio of the mass of oil to the mass of dry biomass feed was obtained from wood chips as well as char (carbon) in an amount of 10 to 22% by weight, 20-25% gas by weight and 20-23% water and water-solubles by weight. The oil produced contained up to 20% oxygen by weight. An embodiment comprises recycling a substantially aqueous liquid to a pretreatment step to increase the thermal efficiency and reduce water consumption.

A further development of the above HTU process is disclosed by Van de Beld et al in U.S. Pat. No. 7,262,331. The further development include pressurizing the feedstock to preferably 130 to 180 bar, heating to a temperature in the range 180-280° C. and maintaining it at these conditions in a period up to 60 minutes to produce a reaction mixture, which is further heated to a temperature in the range 280 to 350° C. over a period of up to 60 minutes. An option includes separation of a liquid fraction containing fermentable compounds from the mixture prior to heating to the reaction temperature. Heating is performed by a combination of indirect heating, direct injection of steam, direct injection of a preheated $CO_2$ containing gas and/or an oxygen containing gas. The process results in a liquid hydrocarbon crude with an oxygen content of 10-25% by weight, a mineral fraction 0.5-10% by weight, and with about 50% of the liquid hydrocarbons boiling above 450° C. The heavy fraction has an oxygen content of 10-20% by weight and mineral content of 0.5 to 25% by weight, and the light fraction has an oxygen content of 5 to 25% and a mineral content of less than 0.5% by weight.

Yokoyama et al (U.S. Pat. No. 4,935,567) discloses a process for producing a liquid hydrocarbon product from cellulotic biomass such as wood by treatment of the biomass by conversion of the biomass at a pressure of 3 to 100 atm and a temperature from 250 C to 400° C. (372 to 378° C. preferred) in the presence of a neutral oxygen-containing organic liquid in the form of alcohols, ketones, ethers, esters and mixtures thereof. A particularly preferred embodiment is when said neutral oxygen-containing organic liquid is acetone. The oxygen containing liquid is claimed to accelerate the reactions and makes it easy to separate the liquefied product from the reaction mixture. Another embodiment include the use of an alkaline catalyst in a concentration of 1 to 10% by weight of the dry biomass. The alkaline catalyst may be used in an amount so that the reaction mixture has a pH in the range 10-14 and preferably in the range. The dry solid content of the biomass is preferably in the range 5 to 20% by weight (5-20 parts). The product was separated by decanting (oil phase heavier than water), and subsequent distillation to distill off water. The liquefied hydrogen products produced had calorific values between 24.5 MJ/Kg and 35.5 MJ/kg and contained 14-31% oxygen by weight. Most of the oils solidified at room temperature and were not considered to be stable at room temperature. An experiment conducted at 375° C. produced oil that didn't solidify at room temperature. Though the patent discloses some parts which may be attractive, the yields achieved are considered as very low i.e. 20-25% of the dry biomass weight. The oxygen content of the produced liquid hydrocarbon product is considered to be high despite the relatively high calorific values. Further be noticed that the pressure being applied is not high enough to ensure that the fluid mixture is in a single phase. Assuming that the fluid mixture comprises pure water, the fluid will be on a vapor phase in the whole temperature range from 200 to 400° C., and at 100 atm the fluid will be on a liquid form up to 312° C., and on a vapor form from 312 to 400° C. This is considered insufficient according to the present invention.

Humfreys (WO2009/015409) discloses a process for converting organic matter such as lignite or brown coal, lignin, cellulose, hemicellulose, organic waste, plastic or a generic polymer into products including mixing it with a supercritical liquid comprising one or more of the group consisting of water, methanol, and ethanol at a pressure greater than 220 bar (up to more than 300 bar) and temperatures in the range 350 to 420° C. The products produced by the process include heavy oil petroleum fractions referred to as oil, asphaltenes and pre-asphaltenes, and also yielding residual char, gas (mostly carbon dioxide) and produced water as the main products. The process disclosed is in many ways very similar to the HTU process described above in relation to the disclosures by Annee et al and Van de Beld et al with major differences being the presence of methanol and/or ethanol in the fluid and/or operation at higher pressures and/or temperatures.

Iversen et al (WO2006/1170002A3) discloses a catalytic process, wherein organic material is converted into hydrocarbon fuels with high efficiency. In this process, organic matter such as biomass, waste and sludges is converted by pressurizing said organic matter to a pressure of at least 225 bar, and heating said fluid comprising said organic matter to a temperature of at least 200° C. in the presence of a homogeneous catalyst (comprising at least one compound of an element of group IA of the periodic table of elements, such as at least one compound of potassium and/or sodium), and subsequently contacting the fluid containing organic material with a heterogeneous catalyst (comprising a compound of at least one element of group IVB of the periodic table such as zirconia and/or titania and/or alpha alumina at a temperature of up to 374° C., while maintaining the fluid at a pH of least 7. In a preferred embodiment described, the heating is performed in a sequential manner, and the hot effluent from the heterogeneous reactor, containing reaction products and/or intermediate reaction products, is at least partly recycled and mixed with the feed mixture after heating to more than 200° C. The combined fluid of the incoming feed mixture and re-circulated reactor effluent is further heated to reactor temperature in a trimheater. Accompanying examples indicate up to 40% of the carbon and up to 76% of the energy contained in the feed being recovered as a liquid hydrocarbon (oil).

Despite that hydrothermal technologies have many potential benefits over conventional methods of processing biomass and other organic macromolecules to useful fuels and chemicals, the fact remains that these technologies have yet not been being widely commercialized (A. Peterson et al, 2008).

There are a number of challenges that may be addressed to improve the effectiveness of processing. These include:

Gasification processes operating without a heterogeneous catalyst at temperatures in the range 450-700° C., demand specialized materials to withstand the high temperature and corrosive environment at these conditions (e.g. A. Peterson et al, 2008).

Effective and economically viable processes demand a feedstock at high dry solid loading e.g. at least 20% by weight. Size reducing and feeding of such feedstock is difficult as it may have a solid appearance and high viscosity, particularly for fibrous materials, and may block orifices and contra valves in pumps. Inadequate pretreatment and/or homogenization and/or pump design has limited a number of processes to operate at low dry solids content, which challenges the economy of such processes (e.g. A. Peterson et al, 2008; M. Osada et al, 2006).

Some feedstock contains high amount of salts and inorganics that can lead to precipitation, fouling and plugging of pipes, heat transfer surfaces, reactors and other process equipment if not properly managed (e.g. A. Peterson et al, 2008; Osada, et al, 2006).

Processes applying heterogeneous catalysts for production of syngas or syncrudes are applied in a number of processes to lower the operating temperature and/or increase the yield of desired product. The success of these processes has been varying. A number of processes have been developed wherein inadequate catalysts which do not withstand hydrothermal processing conditions have been applied. Further the application of such heterogeneous catalysts are prone to clogging of reactors and catalysts pores if not properly designed for high loads of impurities and/or efficient removal of suspended particles prior to said catalytic reactors is performed (A. Peterson et al, 2008, Vogel et al, US2009/0126274A1, Elliott et al, WO2009/099684A3).

Processes are susceptible to formation of tar and chars if process steps and operating conditions are not selected properly. The formation of tars and char may result in increased fouling and result in a less efficient process due to formation of solid residues instead of desired products (Vogel et al, US US2009/0126274A1).

Some feedstocks such as lignite, sub-bituminous coals and high-lignin containing biomasses are susceptible to tar and char formation, and often produce significant amount of solid residues.

Water soluble organic compounds in prior art hydrothermal processes for liquid hydrocarbon production can comprise 5 to 70% of the carbon and to 60% of the energy contained in said carbonaceous material being fed to the process, depending of the specific carbonaceous material and/or combination of carbonaceous materials being converted, specific process steps and process parameters for said hydrothermal conversion process (e.g. Hammerschmidt et al, 2011). Besides representing a process loss reducing the yield of desired products, such water soluble organic products may be considered as pollutants that increases the treatment and purification requirements of the water effluent.

Homogeneous catalysts such as potassium and sodium are well known to enhance the degradation and conversion of organic macromolecules in the feed mixture and suppress formation of coke and char for both gasification and liquefaction processes (A. Peterson, 2008; S. Karagöz et al, 2006; T. Bhaskar et al, 2006; Hammerschimidt, 2011). However, such homogeneous catalysts are relatively expensive, and must be recovered or reused in order to achieve an economically viable process (A. Peterson et al; 2008).

In US 2010/0287825 (Humfreys) a process is disclosed for production of hydrocarbon, where as the input feed mixture lignite is foreseen, and where the lignite is milled to a particled size of 40 microns and mixed to a slurry that is fed into the process.

Such milling to a particle size of 40 microns or similar is difficult for other feedstocks than lignite and energy and cost intensive and hence not desired. When operating with feedstock other than lignite such as lignocellulosic feedstock it may even be impossible to obtain such particle sizes.

Hence an improved feed mixture for production of hydrocarbons as the main product and not suffering from the problems and disadvantages from the prior art is advantageous and desirable.

OBJECTIVE OF THE INVENTION

Accordingly, it is an object of the invention to provide an improved feed mixture for use in a process for the production of hydrocarbon allowing for a wider composition of the feed mixture, and further, which feed mixture will allow for a higher content of dry matter in the feed mixture and hence an increased yield of the hydrocarbon process.

SUMMARY OF THE INVENTION

According to the invention the objective is achieved through a feed mixture comprising one or more carbonaceous feedstocks and water, where further a texturing agent has been added to the feed mixture, the texturing agent being adapted to stabilize the feed mixture to prevent separation and further to maintain the feed mixture as a homogenous mixture during a pressurization.

A texturing agent in the present context is an agent that inhibits separation of the ingredients in the feed mixture e.g. by ensuring that the feed mixture remains in a homogeneous state after preparation and until fed into a process plant. Also during the pressurization in such process plant the texturing agent will have the effect that the feed mixture remains in a uniform or homogeneous state, and hence avoids clogging of the pump and piping due to an undesired separation of the liquid content from the feed mixture during pressurization.

The texturing agent may have a thickening effect e.g. the texturing agent may increase the viscosity of the liquid/solid feed mixture without substantially modifying other properties.

A thickening texturing agent may also improve the suspension of other ingredients or emulsions which increases the stability of the feedstock. Some thickening texturing agents according to the present invention are gelling agents (gellants), forming a gel, which dissolves in the liquid phase as a colloid mixture that forms a weakly cohesive internal structure. Other texturing agents according to the present invention act as mechanical pseudoplastifying or thixotropic additives with discrete particles adhering or interlocking to resist strain.

Still other effects of the texturing agent according to the present invention may be a lowering of the friction of said feed mixture when pumped.

Another requirement of the texturing agent according to the present invention is that it should be adapted to be converted or degraded during the use in the hydrocarbon production process.

Preferably said process for producing hydrocarbons includes pressurizing said feed mixture to a pressure of at least 100 bar; preferably to a pressure of at least 150 bar such as to a pressure of at least 218 bars; more preferably pressurizing said feed mixture to a pressure of at least 250 bar such as to a pressure of at least 280 bars; even more preferably pressurizing said feed mixture to a pressure of at least 300 bars such as to a pressure in the range 300 to 375 bars.

Preferably the pressurized feed mixture is heated to a temperature of at least 300° C., such as at least 350° C.; preferably a temperature of at least 370° C. such as a temperature of at least 380° C.; more preferably a temperature of at least 390° C. such as a temperature in the range 400 to 430° C.

Advantageously the texturing agent is adapted to be converted or degraded during the hydrocarbon production process.

Preferably said one or more carbonaceous material comprises lignocellulosic material.

Advantageously the feed mixture comprises carbonanceaous material from at least two different feed stocks. As an example the texturing agent comprises micro algae, peat or a pulp of carbonaceous material or a combination thereof, wherein said pulp may be an off spec Kraft pulp.

Further the texturing agent may comprise vinasse, molasses, glycerine such as crude glycerine from biodiesel production, palm oil manufacturers effluent ("POME"), tall oil or black liquor from paper production.

Advantageously the texturing agent is added in a concentration of 1-50% by weight of total dry matter content of said carbonaceous feedstock, preferably 2-30% by weight, more preferred 5-20% of total dry matter.

The pulp may be produced by treating part of said one or more carbonaceous material(s) with a base at a temperature in the range 150 to 230° C.

For example the base for said pulping process is selected from sodium hydroxide, potassium hydroxide, potassium carbonate, ammonia or a combination thereof.

Advantageously the concentration of said base added to produce said pulp are in the range 5 to 30 percent by weight, preferably in the range 10 to 20 percent by weight.

The pulp may be produced by treating part of said one or more carbonaceous materials further comprises adding water soluble organics before or during the treatment of part of said one or more carbonaceous material(s).

For example said water soluble organics comprises at least one alcohol having a carbon chain length of 1-6, and/or at least one phenol or phenol derivative and/or at least one catechol and/or at least one ketone having a chain length of 1-6- and/or at least one organic acids having a chain length of 1-6 or a mixture thereof.

For example said water soluble organics comprises glycerine such as crude glycerine.

Advantageously said water soluble organics are present in a concentration in the range 5-40% by weight such as 5-30% by weight; preferably in a concentration in the range 5-25% by weight; more preferably in the range 5-20% by weight such as 10-30 by weight.

Preferably the temperature of said pulping process is in the range 150 to 230° C., preferably in the range 160 to 200° C., more preferably in the range 165 to 185° C.

For example the part of the carbonaceous feedstock being pulped is in the range 20% to 80% by weight of the total carbonaceous feedstick in the feed mixture such as in the range 30% to 70% by weight; preferably in the range 40-60% by weight.

Advantageously the texturing agent or an additional texturing agent is chosen among the following: Hydrocolloids, polysaccharides, carboxymethylcellulose (CMC), methylcellulose, hydroxypropyl methylcellulose, microcrystalline cellulose (MCC), nanocrystalline cellulose (NCC), polyanionic cellulose (PAC), pectin, hydrocolloids such saccahrides such as carrageenan, pullulan, konjac and alginate, agar-agar, *cassia* gum, gellan gum, guar gum, locust bean gum and xanthan gum and combinations thereof.

Further advantageously the texturing agent comprises a cellulotic material or a derivative of a cellulotic material.

For example the texturing agent is selected from carboxy methyl cellulose (CMC), methyl cellulose, hydroxypropyl methyl cellulose, microcrystalline cellulose, nanocrystalline cellulose, polyanionic cellulose and combination thereof.

Advantageously the molecular weight of said texturing agent is in the range 10000 to 1000000, preferably in the range 50000 to 750000.

Advantageously the degree of polymerization is in the range 100 to 5000.

Advantageously the degree of substitution is in the range 0.5-1.5, preferably in the range 0.60-1.0.

Preferably the texturing agent is added in a concentration of 0.01 to 10% by weight, preferably in the range 0.02-5% by weight, more preferably 0.05 to 2 by weight, most preferably in the range 0.1 to 1% by weight.

Preferably the concentration of water is less than 75% by weight such as less than 65% by weight, preferably less than 60% by weight such as less than 55% by weight, more preferably less than 50% by weight such as less than 45% by weight.

Preferably the concentration of water is at least 25% by weight such as at least 30% by weight, preferably at least 35% by weight such as at least 40% by weight, more preferably at least 45% by weight such as at least 50% by weight.

For example the concentration of water is in the range 15 to 75% by weight such as in the range 20 to 60% by weight, preferably in the range 35-60% by weight such as in the range 35 to 55% dry weight.

The feed mixture may further comprise at least one liquid organic compound, the concentration of said at least one liquid organic compound contained in the feed mixture is at least 10% by weight, preferably at least 15% by weight, more preferred at least 20% by weight and even more preferred at least 25% by weight such as at least 30% by weight.

Advantageously said at least one liquid organic compound comprises hydrocarbons produced by the process.

Advantageously the concentrations of said hydrocarbons produced by the process is at least 10% by weight, preferably at least 15% by weight, more preferred at least 20% by weight, even more preferred at least 25% by weight such as at least 30% by weight.

Advantageously said least one liquid organic compound comprises water soluble organics produced by the process.

Preferably the concentration of said water soluble organics are in a concentration of at least 2% by weight such as least 5% by weight, preferably at least 10% by weight.

For example the concentration of said water soluble organics are in the range 2 to 40%, preferably in the range 5 to 35% such as in the range 5 to 20% by weight.

Preferably the ratio of weight of said one or more liquid organic compounds to the dry weight of carbonaceous material in said feed mixture is in the range 0.1 to 2.0, preferably in the range 0.5-1.5, more preferred in the range 0.75-1.25

Advantageously the feed mixture provided contains at least one homogeneous catalyst in the form of a compound of potassium and/or sodium so as to ensure a total concentration of potassium and sodium of at least 0.5% by weight, preferably 1-10% by weight, more preferably in the range 2-5% by weight.

Advantageously the feed mixture contains ammonia in a concentration in the range 0.1-10% by weight.

Advantageously the pH of said feed mixture is in the range 7-14, preferably in the range 8-13, more preferably said feed mixture has a pH in the range 8.5-12.

Advantageously the concentration of the homogeneous catalysts and base in the feed mixture are controlled so as to maintain a pH in the range 6.5-14 at any location of the conversion process of said one or more carbonaceous materials.

Advantageously the feed mixture comprises a dry solid content of carbonaceous material in the range 15 to 60% dry matter by weight such as 20-50% dry matter by weight, preferably in the range 20 to 40% dry matter by weight.

For example the feed mixture may comprise a dry solid content of carbonaceous material that is in a concentration of at least 15% dry matter by weight such as at least 20% dry matter, preferably in a concentration of at least 25% dry matter by weight such as at least 30% dry matter, more preferably said one or more organic raw materials is/are in a concentration of at least 35% dry matter by weight such as at least 40% dry matter Further the feed mixture may comprise a dry solid content of carbonaceous material in the range 15 to 50% by weight such as a dry solid content of carbonaceous material in the range 15 to 45% by weight; preferably the feed mixture comprising a dry solid content of carbonaceous material in the range 15 to 50% by weight such as a dry solid content of carbonaceous material in the range 15 to 45% by weight.

Advantageously the feed mixture comprises carbonaceous particles with a particle size of maximum 5 mm, with a maximum diameter of 2 mm, advantageously with a maximum diameter of 1 mm, preferably of maximum 0.5 mm, more preferred of maximum 0.5.

Preferably the viscosity of said feed mixture are in the range 500 to 100000 cP, preferably in the range 1000 to 75000 cP, and more preferably 5000 to 50000 cP.

The invention further is realised through processes for preparing a feed mixture. In one embodiment a process for preparing a feed mixture for use in a process for producing hydrocarbon, comprises:
 a. Providing at least one feedstock of carbonaceous material;
 b. Providing a desired water content;
 c. Providing a desired content of homogeneous catalyst in the form of a compound of potassium and/or sodium;
 d. Providing a desired content of liquid organic compound
 e. Providing a texturing agent adapted to stabilize the feed mixture in a preprocess condition and further during pressurization;

f. Mixing the ingredients a)-e) for a time sufficient to provide a homogeneous feed mixture.

In a further embodiment a process for preparing a feed mixture for use in a process for producing hydrocarbon, comprises:
g. Providing at least one feedstock of carbonaceous material;
h. Providing a desired water content;
i. Providing a desired content of homogeneous catalyst in the form of a compound of potassium and/or sodium;
j. Providing a desired content of liquid organic compound
k. Mixing the ingredients a) to d)
l. Providing a texturing agent adapted to stabilize the feed mixture in a preprocess condition and further during pressurization, and dissolving said texturing agent with a suitable amount of water water; and
m. Mixing said dissolved texturing agent with the resulting mixture from e) for a time sufficient to provide a homogeneous feed mixture.

In a still further embodiment a process for preparing a feed mixture for use in a process for producing hydrocarbon, comprises:
n. Producing of texturing agent in the form of a pulp by
  i. Providing at least one feedstock of carbonaceous material;
  ii. Providing a desired water content;
  iii. Providing a desired content of homogeneous catalyst in the form of a compound of potassium and/or sodium;
  iv. Mixing the ingredients a) to c);
  v. Adjusting the pH of the mixture to a pH in the range 10-14, preferably in the range 11-12.5 by addition of base;
  vi. Heating said pH adjusted mixture to a temperature in the range 150-230° C. under stirring to produce a texturing agent in the form of a pulp;
o. Providing at least one feed stock of carbonaceous material;
p. Providing a desired amount of water;
q. Providing a desired content of homogeneous catalyst in the form of a compound of potassium and/or sodium;
r. Providing a desired content of liquid organic compound
s. Mixing the ingredients a) to e) for a time sufficient to provide a homogeneous feed mixture.

Still further a process for preparing a feed mixture for use in a process for producing hydrocarbon, may comprise:
t. Producing af texturing agent in the form of a pulp by
  i. Providing at least one feedstock of carbonaceous material;
  ii. Providing a desired water content;
  iii. Providing a desired content of homogeneous catalyst in the form of a compound of potassium and/or sodium;
  iv. Providing a desired content of liquid hydrocarbon product
  v. Providing a desired amount of water soluble organics
  vi. Mixing the ingredients i. to v.;
  vii. Adjusting the pH of the mixture to a pH in the range 10-14, preferably in the range 11-12.5 by addition of base;
  viii. Heating said pH adjusted mixture to a temperature in the range 150-230° C. under stirring to produce a texturing agent in the form of a pulp;
u. Providing at least one feed stock of carbonaceous material;
v. Providing a desired amount of water;
w. Providing a desired content of homogeneous catalyst in the form of a compound of potassium and/or sodium;
x. Providing a desired content of liquid organic product
y. Providing a desired amount of water soluble organics
z. Mixing the ingredients a) to f) for a time sufficient to provide a homogeneous feed mixture.

Further a process for preparing a feed mixture for use in a process for producing hydrocarbon is foreseen, comprising:
aa. Producing af texturing agent in the form of a pulp by
  i. Providing at least one feedstock of carbonaceous material;
  ii. Providing a desired water content;
  iii. Providing a desired content of homogeneous catalyst in the form of a compound of potassium and/or sodium;
  iv. Providing a desired amount of liquid hydrocarbon product
  v. Providing a desired amount of water soluble organics;
  vi. Mixing the ingredients i. to v.;
  vii. Adjusting the pH of the mixture to a pH in the range 10-14, preferably in the range 11-12.5 by addition of base;
  viii. Heating said pH adjusted mixture to a temperature in the range 150-230° C. under stirring to produce a texturing agent in the form of a pulp;
bb. Providing at least one feed stock of carbonaceous material;
cc. Providing a desired amount of water;
dd. Providing a desired content of homogeneous catalyst in the form of a compound of potassium and/or sodium;
ee. Providing a desired content of liquid hydrocarbon product
ff. Providing a desired amount of water soluble organics
gg. Adjusting pH of the feed mixture and buffer capacity of the feed mixture to control the pH
hh. Mixing the ingredients a) to g) for a time sufficient to provide a homogeneous feed mixture.

A further process for preparing a feed mixture for use in a process for producing hydrocarbon, may comprise:
ii. Producing of texturing agent in the form of a pulp by
  i. Providing at least one feedstock of carbonaceous material;
  ii. Providing a desired water content;
  iii. Providing a desired content of homogeneous catalyst in the form of a compound of potassium and/or sodium;
  iv. Providing a desired amount of liquid hydrocarbon product;
  v. Providing a desired amount of water soluble organics
  vi. Mixing the ingredients i. to v.;
  vii. Adjusting the pH of the mixture to a pH in the range 10-14, preferably in the range 11-12.5 by addition of base;
  viii. Heating said pH adjusted mixture to a temperature in the range 150-230° C. under stirring to produce a texturing agent in the form of a pulp;
jj. Providing at least one feed stock of carbonaceous material;
kk. Providing a desired amount of water;
ll. Providing a desired content of homogeneous catalyst in the form of a compound of potassium and/or sodium;
mm. Providing a desired content of liquid hydrocarbon product;
nn. Providing a desired amount of water soluble organics oo. Adjusting pH of the feed mixture and buffer capacity of the feed mixture to control the pH
pp. Mixing mixture the ingredients a) to g) and controlling the particle size by withdrawing said feed mixture, passing it through a size reduction step such as a macerator and recirculating said feed mixture to the mixing device for a time sufficient to provide a homogeneous feed mixture.

Still further a process for preparing a feed mixture for use in a process for producing hydrocarbon, comprises:
qq. Producing of texturing agent in the form of a pulp by
  i. Providing at least one feedstock of carbonaceous material;
  ii. Providing a desired water content;
  iii. Providing a desired content of homogeneous catalyst in the form of a compound of potassium and/or sodium;
  iv. Providing a desired amount of liquid hydrocarbon product;
  v. Providing a desired amount of water soluble organics
  vi. Mixing the ingredients i. to v.;
  vii. Adjusting the pH of the mixture to a pH in the range 10-14, preferably in the range 11-12.5 by addition of base;
  viii. Heating said pH adjusted mixture to a temperature in the range 150-230° C. under stirring to produce a texturing agent in the form of a pulp;
rr. Providing at least one feed stock of carbonaceous material;
ss. Providing a desired amount of water;
tt. Providing a desired content of homogeneous catalyst in the form of a compound of potassium and/or sodium;
uu. Providing a desired content of liquid hydrocarbon product;
vv. Providing a desired amount of water soluble organics
ww. Adjusting pH of the feed mixture and buffer capacity of the feed mixture to control the pH
xx. Mixing mixture the ingredients a) to g) and controlling the particle size by withdrawing said feed mixture, passing it through a size reduction step such as a macerator and recirculating said feed mixture to the mixing device for a time sufficient to provide a homogeneous feed mixture.
yy. where h. is performed using a Gorator type pump.

Finally the invention is realised through use of a feed mixture for producing hydrocarbon in a process with increased pressure and temperature compared to surrounding atmospheric conditions.

Further embodiments and advantageous effects of the present invention are presented in the following description of preferred embodiments of the invention.

Throughout this document the terms "comprising" or "comprises" do not exclude other possible elements or steps. Also, the mentioning of references such as "a" or "an" etc. should not be construed as excluding a plurality.

DESCRIPTION OF PREFERRED EMBODIMENTS OF THE INVENTION

The method and apparatus according to the invention will now be described in more detail with regard to the accompanying figures. The figures show one way of implementing the present invention and is not to be construed as being limiting to other possible embodiments falling within the scope of the attached claim set.

Figure 1:
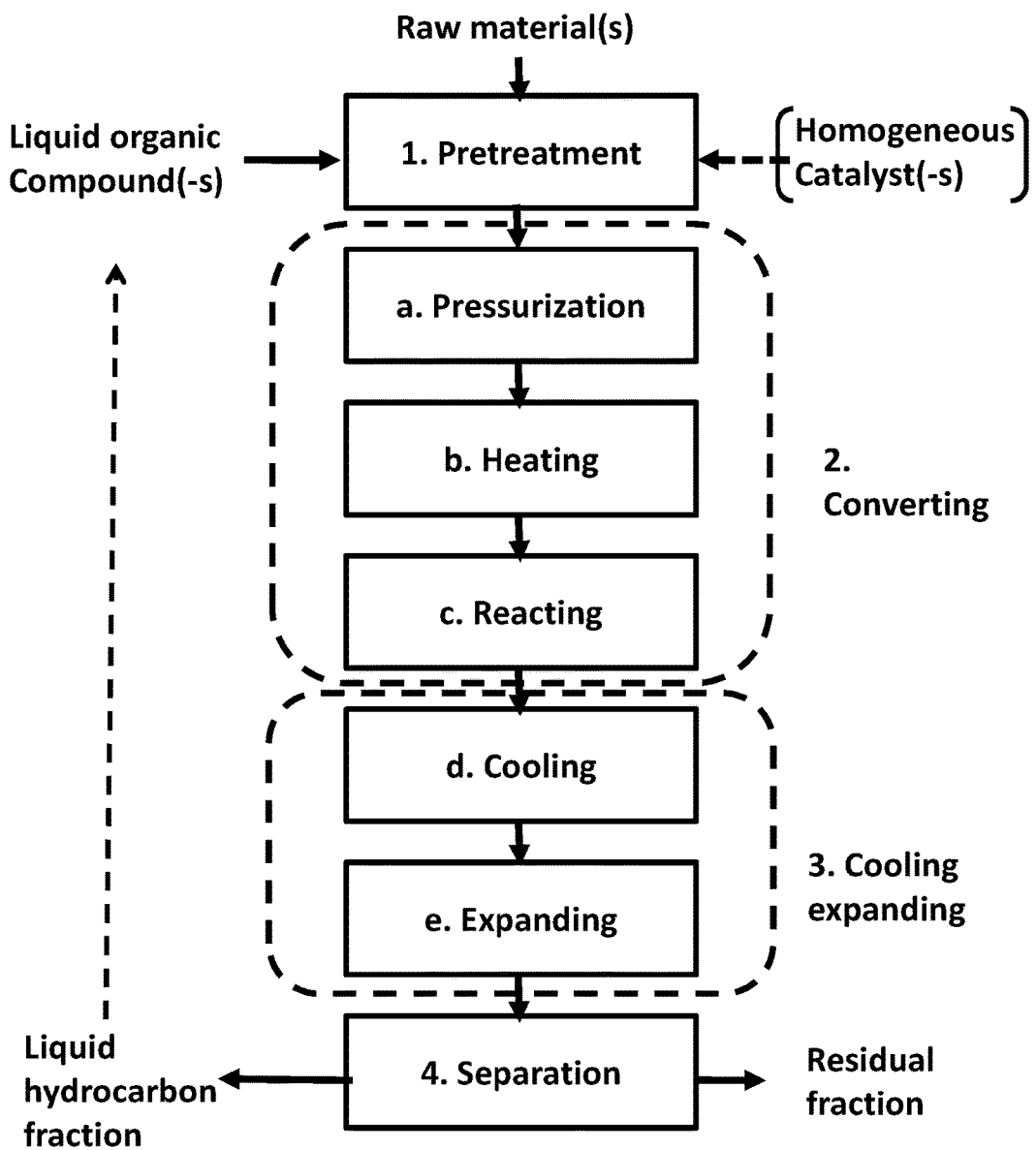
FIG. 1 shows a schematic diagram of an embodiment of a conversion process according to the present invention.

FIG. 1 shows a simplified flow diagram of a continuous hydrothermal process for conversion of carbonaceous material to liquid hydrocarbons according to an embodiment of the present invention.

The carbonaceous material to be converted in a process may be contained in one or more feedstock. The feedstock may be on a solid form or may have a solid appearance, but may also be in the form of sludge or a liquid. The desired dry solid content of the feed mixture according to many embodiments of the present invention is at least 20% by weight such as at least 25% by weight, and preferably the dry solid content of said carbonaceous material is at least 30% by weight such as at least 40% by weight. Characterizing for the feed mixture is the content of a texturizing agent that will ensure that the feed mixture remains homogeneous prior to entering the process and further during pressurization in the process.

Non-limiting examples of suitable carbonaceous feedstock that may be converted by a process according to the present invention include ancient biomass such as low rank coals such as lignite, sub bituminous coals, peat, moss, spaghnum; biomass such as wood, wood chips, sawdust, forestry thinnings and waste, shavings, slash, bark, leaves, off spec fibres from paper production, paper sludge, lignin, cellulose, hemicellulose, sugars, protein, wine trash and agricultural residues and byproducts such as grasses, straw, stems, stover, husk, cobs, shells from e.g. wheat, rye, corn, rice, sunflowers; empty fruit bunches from palm oil production, palm oil manufacturers effluent (POME, bagasse), manure fibres from livestock production, greenhouse waste, garden waste and weeds; energy crops like jatropha, sorghum, switchgrass and *miscanthus*; aquatic biomass such as macroalgae, microalgae, bacteria such as cyanobacteria; waste, residues and byproducts from industry such as residues from olive production, residues and byproducts from juice production, residue from wine production, residues, byproducts and waste streams from vegetable oil production; Residues, byproducts and waste from food production such as brewers spent grains and yeast; residues and byproducts from fruit and vegetable processing such as pulp; residues and byproducts from fermentation processes such as wet distillers grain, vinasse, molasses, black liquor from paper production, aerobic and anaerobic digested sludges e.g. sewage sludge from wastewater cleaning and/or digested sludge from biogasification, leachate, clarifier sludge, paper waste, green fraction of household waste, restaurant waste, slaughter house waste, risk material from meat and bone processing, municipal solid waste, used and recycle oils, fat, organic solvents, glycerine such as crude glycerine from biodiesel production, refinery wastes, plastic and polymers and combinations thereof.

A particularly preferred embodiment is where said one or more carbonaceous material comprises lignocellulosic material.

A further preferred embodiment is where the carbonaceous material in the feed is provided from at least two different feed stocks.

The carbonaceous material in said one or more feedstock is added to a pretreatment step, wherein said feed stock is transformed into a feed mixture in the form of a pumpable slurry or paste according to the present invention.

Said addition may involve controlling the maximum particle size to less than 30 mm such as a particle size of maximum 10 mm, and preferably a particle size of maximum 5 mm such as a particle size of maximum 1 mm, and even more preferably a particle size of maximum 0.5 mm such as a particle size of less than 0.25 mm.

Depending of the character of the specific feedstock, said controlling of the particle size may comprise one or more of the operations of sieving, filtering, and/or settling operation and/or size reduction by one or more crushing, cutting, grinding, attriting and/or milling operations.

Control of maximum particle size in the pre-treating is important for the rheological properties of the feed mixture and also for the mass- and heat transfer within the particles during said second step of converting.

In many embodiments of the present invention said one or more carbonaceous feedstocks comprises a fibous lignocellulosic material. Many size reduction techniques for such fibrous materials are available for dry materials e.g. knife mills, hammer mills, impeller mills, cone mills and stone mills or combinations thereof. Further a wide range of techniques are available for wet materials at low materials including different kind of wet milling techniques such as ball mills, colloidal mills, cutting mills, macerators, etc.

At moisture contents up 20-30% such materials can be milled "as is" to particles sizes well below 1 mm in most dry milling systems such as hammermills without interrupting the operation of the mill due to clogging of the screens due to the moisture content. However, for more moist materials such as materials having a moisture content in the range 20 to 60% such size reduction is demanding without drying the feedstock material. Drying of the feedstock material is energy intensive and normally undesired. Such milling is according to an embodiment of the present invention performed using a hammer mill with a controlled vacuum on the screen for prevention of clogging of the screen. In another embodiment according to the present invention clogging of the said screens in the hammer mill may be prevented by mixing the moist material with a drier material.

However, even with a size reduction to a particle size of less than 250 μm feedstock such as lignocellulosic materials can be difficult to wet and to prepare as a homogenous feed mixture at desired dry solid contents having proper rhelogical properties for pumping to an elevated pressure without squeezing the fluid out of said feed mixture thereby leaving a solid clog of the carbonaceous feedstock in the pump and/or check valves.

Hence, a preferred embodiment for preparing a feed mixture suitable for use in a process for producing liquid hydrocarbons at elevated pressure and temperature according to the present invention comprises:
  a. Providing at least one feedstock of carbonaceous material;
  b. Providing a desired water content;
  c. Providing a desired content of homogeneous catalyst in the form of a compound of potassium and/or sodium;
  d. Providing a desired content of liquid organic compounds
  e. Providing at least one texturing agent adapted to stabilize the feed mixture in a preprocess condition and further during pressurization;
  f. Mixing the ingredients a)-e) for a time sufficient to provide a homogeneous feed mixture.

Water is important for the desired conversion of the carbonaceous material to proceed, and according to an embodiment of the present invention it needs to be within certain ranges. The desired concentration of water generally is less than 75% by weight such as less than 65% by weight, preferably less than 60% by weight such as less than 55% by weight, more preferably less than 50% by weight.

Further the content of water is generally at least 15% by weight such as at least 30% by weight, preferably at least 35% by weight such as at least 40% by weight, more preferably at least 45% by weight such as at least 50% by weight.

Hence, the feed mixture according to an embodiment the present invention further comprises water in an amount of at least 25% such as at least 40%, and preferably the water content of said feed mixture is in the range 30 to 80% such as in the range 30 to 70%. Advantageously, the water content in said feed mixture is in the range 40-60% by weight.

The desired content of homogenous catalyst in the form of potassium and/or sodium is advantageously a total concentration of at least 0.5% by weight. preferably 1-10% by weight, more preferably in the range 2-5% by weight. Preferred forms of potassium and/or sodium according to the present invention include potassium hydroxide, sodium hydroxide, potassium carbonate, sodium carbonate, potassium bicarbonate, sodium bicarbonate, potassium formate, sodium formate, potassium acetate, sodium acetate, potassium citrate, sodium citrate. In some embodiments of the present invention said addition of potassium and/or sodium at least partly includes mixing a feedstock with a high content of potassium with a feedstock having a lower content of potassium and/or sodium.

Said at least one liquid organic compound may be added as a single compound. However, in many embodiments according to the present invention said at least one liquid organic compound may comprise a range of organic compounds, and is preferably at least partly produced in situ in the process, and separated, recovered and recycled to said first step of pre-treating.

According to a preferred embodiment said at least one liquid organic compounds is/are at least partly produced within the process, and separated or recovered and subsequently recycled to said first step of pre-treating. According to a preferred embodiment according to the present invention said one or more liquid compounds comprise a liquid hydrocarbon produced by the process such as a fraction of said liquid hydrocarbon product produced by the process e.g. the heaviest fraction of said liquid hydrocarbons produced as further described and exemplified below. Further said one or more liquid hydrocarbons may or may further comprise water soluble organic compounds produced in the process.

In a preferred embodiment according to the present invention said at least one liquid organic compound being added in said pretreatment step comprises liquid hydrocarbon product produced by the process and/or a fraction of said liquid hydrocarbon product produced by the process such as the heaviest fraction of said hydrocarbon product.

In another preferred embodiment according to the present invention said at least one liquid organic compound comprises or further comprises water soluble organics produced in the process and recovered from said residual fraction.

In a preferred embodiment further comprising at least one liquid organic compound, the concentration of said at least one liquid organic compound contained in the feed mixture is at least 10% by weight, preferably at least 15% by weight, more preferred at least 20% by weight and even more preferred at least 25% by weight such as at least 30% by weight.

Said one or more liquid organic compounds in the form of water soluble organics is according to the present invention present in a concentration of at least 1% by weight such as at least 2% by weight. In a preferred embodiment of the present invention said one or more organic compounds is present in a concentration of at least 5% by weight such as at least 10 or at least 20% by weight.

In many applications, the concentration of said water soluble organics are in the range 2 to 40%, preferably in the range 5 to 35% such as in the range 5 to 20% by weight.

In general the amount of liquid organic compounds required depends on the amount of carbonaceous material added and needs to be within a desired range to obtain the desired effects according to the present invention e.g. too much liquid organic compounds results in the content of other ingredients being with out the desired range. Hence, in a preferred embodiment of the present invention, the ratio of weight of said one or more liquid organic compounds to the dry weight of carbonaceous material in said feed mixture is in the range 0.1 to 2.0, preferably in the range 0.5-1.5, more preferred in the range 0.75-1.25.

The texturing agent according to the present invention is adapted to be converted or degraded to same products as the carbonanceous during the hydrocarbon production process.

The texturing agent may according to a preferred embodiment according to the present invention comprise micro algae, bacteria such as cyanobacteria; peat, palm oil manufacturers effluent (POME); residues, byproducts and waste from food production such as brewers spent grains and yeast; residues and byproducts from fruit and vegetable processing such as pulp; residues and byproducts from fermentation processes such as wet distillers grain, vinasse, molasses, black liquor from paper production, aerobic and anaerobic digested sludges e.g. sewage sludge from wastewater cleaning and/or digested sludge from biogasification and/or an off sepc Kraft pulp and/or a pulp of carbonaceous material prepared according to the present invention and/or a combination thereof.

The texturing agent may according to many embodiments of the present invention be added in a concentration of 1-50% by weight of total dry matter content of said carbonaceous feedstock, preferably 2-50% by weight, more preferred 5-50% of total dry matter such as in the range 10 to 20% by weight.

An advantageous embodiment of the present invention is where at least part of the carbonaceous material is used to produce a texturing agent in the form of a pulp such as a process for preparing a feed mixture for use in a process for producing hydrocarbon, comprising:
 a. Producing of texturing agent in the form of a pulp by
  i. Providing at least one feedstock of carbonaceous material;
  ii. Providing a desired water content;
  iii. Providing a desired content of homogeneous catalyst in the form of a compound of potassium and/or sodium;
  iv. Providing a desired content of liquid organic compounds
  v. Mixing the ingredients a) to c);
  vi. Controlling and adjusting the pH of the mixture to a pH in the range 10-14, preferably in the range 11-12.5 by addition of base;
  vii. Heating said pH adjusted mixture to a temperature in the range 150-230° C. under stirring to produce a texturing agent in the form of a pulp;
 b. Providing at least one feed stock of carbonaceous material;
 c. Providing a desired amount of water;
 d. Providing a desired content of homogeneous catalyst in the form of a compound of potassium and/or sodium;
 e. Providing a desired content of liquid organic compound
 f. Mixing the ingredients a) to e) for a time sufficient to provide a homogeneous feed mixture.

The particle size of the carbonaceous material added for said pulping process according to i. may be significantly larger than the particle size of the materials the feed mixture. In an advantageous embodiment the maximum particle size of the material being added to said pupling process may be at least 10 times larger than the maximum particle size of said feed mixture such as at least 50 times larger than the maximum particle size of said feed mixture. Preferably the maximum particle size of the carbonaceous material being added to said pupling process may be at least 100 times larger than the maximum particle size of said feed mixture such as at least 500 times larger than the maximum particle size of said feed mixture.

The ratio of the carbonaceous material being used in the pulping process (i.-vii) may to the total amount carbonaceous material generally be in the range 10-80% by weight such as 25 to 75% by weight, preferably the ratio of the carbonaceous material being used in the pulping process (i.-vii) may to the total amount carbonaceous material generally be in the range 33-66% by weight such as 40-60% by weight.

During the production of the texturing agent by pulping the macrostructure of the carbonaceous material is broken down by reactions such as alkaline hydrolysis and solvolysis type of reaction. Hence, in many applications it is advantageous to add all the liquid organic compounds (steps iv.+e) and homogeneous catalyst (steps iii+d) and base (v) to said pulping process steps i. to vii.

The pH adjustment may be performed by measuring and adjusting the pH by base addition. Suitable bases for pH adjustment according to the present invention includes sodium hydroxide, potassium hydroxide, potassium carbonate, sodium carbonate and/or ammonia.

The conversion process of said feed mixture according to the present invention is advantageously carried out under alkaline conditions at all locations in the process i.e. the pH is maintained at a value above 7 such as a pH in the range 7 to 14, and preferably in the range 8 to 12 such as a pH value in the range 8 to 10 at all locations in the process. Operation under such alkaline conditions assists enhances certain chemical reactions such as water gas shift and steam cracking, while suppressing undesired side reactions such as char formation.

Alkaline conditions during said conversion minimize corrosion.

Hence, in many embodiment of the present invention the process of producing said feed mixture includes measuring and adjusting the pH of the feed mixture so as to obtain a pH value in the above preferred ranges.

Hence, a preferred embodiment according to the present invention includes a process for preparing a feed mixture for use in a process for producing hydrocarbon, comprising:

a. Producing of texturing agent in the form of a pulp by
   i. Providing at least one feedstock of carbonaceous material;
   ii. Providing a desired water content;
   iii. Providing a desired content of homogeneous catalyst in the form of a compound of potassium and/or sodium;
   iv. Providing a desired amount of water soluble organics
   v. Providing a desired amount of liquid organic compounds
   vi. Mixing the ingredients i. to iv.;
   vii. Adjusting the pH of the mixture to a pH in the range 10-14, preferably in the range 11-12.5 by addition of base;
   viii. Heating said pH adjusted mixture to a temperature in the range 150-230° C. under stirring to produce a texturing agent in the form of a pulp;
b. Providing the desired amount of carbonaceous feedstock from at least one feed stock of carbonaceous material;
c. Providing a desired amount of water;
d. Providing a desired content of homogeneous catalyst in the form of a compound of potassium and/or sodium;
e. Controlling and adjusting pH and buffer capacity of the feed mixture to control the pH
f. Mixing the ingredients a) to g) for a time sufficient to provide a homogeneous feed mixture.

The controlling and adjusting of pH and buffer capacity of the feed mixture may according to an embodiment of the present invention be performed measuring the pH of the water phase after the conversion process, and controlling the pH by adding a more or less base. The base for said addition may be the same potassium and/or sodium source as used for control of said at least one homogeneous catalyst, but may also be another base such as ammonia and/or urea.

A particularly preferred embodiment according to the present invention is where the mixing of the mixture of the ingredients a) to g) and controlling the particle size is at least partly performed by withdrawing said feed mixture, passing it through a size reduction step such as a macerator and recirculating said feed mixture to the mixing device for a time sufficient to provide a homogeneous feed mixture.

Hence, an advantageous process for preparing a feed mixture for use in a process for producing hydrocarbon according to the present invention, comprises:
a. Producing of texturing agent in the form of a pulp by
   i. Providing at least one feedstock of carbonaceous material;
   ii. Providing a desired water content;
   iii. Providing a desired content of homogeneous catalyst in the form of a compound of potassium and/or sodium;
   iv. Providing a desired amount of water soluble organics
   v. Mixing the ingredients i. to iv.;
   vi. Adjusting the pH of the mixture to a pH in the range 10-14, preferably in the range 11-12.5 by addition of base;
   vii. Heating said pH adjusted mixture to a temperature in the range 150-230° C. under stirring to produce a texturing agent in the form of a pulp;
b. Providing at least one feed stock of carbonaceous material;
c. Providing a desired amount of water;
d. Providing a desired content of homogeneous catalyst in the form of a compound of potassium and/or sodium;
e. Providing a desired content of liquid organic compound
f. Providing a desired amount of water soluble organics
g. Adjusting pH of the feed mixture and buffer capacity of the feed mixture to control the pH
h. Mixing mixture the ingredients a) to g) and controlling the particle size by withdrawing said feed mixture, passing it through a size reduction step such as a macerator and recirculating said feed mixture to the mixing device for a time sufficient to provide a homogeneous feed mixture.

A particularly preferred mixing and size reduction technique according to the present invention is where the size reduction is according to an embodiment of the present invention where said maceration is performed as an integral part of a pump for pre-pressurizing said feed mixture such as a Gorator pump or double or multiple screw extruders.

Hence, a particularly preferred embodiment is process for preparing a feed mixture for use in a process for producing hydrocarbon, comprising:
a. Producing of texturing agent in the form of a pulp by
   i. Providing at least one feedstock of carbonaceous material;
   ii. Providing a desired water content;
   iii. Providing a desired content of homogeneous catalyst in the form of a compound of potassium and/or sodium;
   iv. Providing a desired amount of water soluble organics
   v. Mixing the ingredients i. to iv.;
   vi. Adjusting the pH of the mixture to a pH in the range 10-14, preferably in the range 11-12.5 by addition of base;
   vii. Heating said pH adjusted mixture to a temperature in the range 150-230° C. under stirring to produce a texturing agent in the form of a pulp;
b. Providing at least one feed stock of carbonaceous material;
c. Providing a desired amount of water;
d. Providing a desired content of homogeneous catalyst in the form of a compound of potassium and/or sodium;
e. Providing a desired content of liquid organic compound
f. Providing a desired amount of water soluble organics
g. Adjusting pH of the feed mixture and buffer capacity of the feed mixture to control the pH
h. Mixing mixture the ingredients a) to g) and controlling the particle size by withdrawing said feed mixture, passing it through a size reduction step such as a macerator and recirculating said feed mixture to the mixing device for a time sufficient to provide a homogeneous feed mixture.
   i. where h. is performed using a Gorator type pump.

A preferred texturing agent or additional texturing according to an embodiment of the present invention is chosen among the following: Hydrocolloids, polysaccharides, carboxymethylcellulose (CMC), methylcellulose, hydroxypropyl methylcellulose, microcrystalline cellulose (MCC), nanocrystalline cellulose (NCC), polyanionic cellulose (PAC), pectin, hydrocolloids such saccharides such as carrageenan, pullulan, konjac and alginate, agar-agar, *cassia* gum, gellan gum, guar gum, locust bean gum and xanthan gum and combinations thereof.

A particularly preferred texturing agent comprises a cellulotic material or a derivative of a cellulotic material such as selected from carboxy methyl cellulose (CMC), methyl cellulose, hydroxypropyl methyl cellulose, microcrystalline cellulose, nanocrystalline cellulose, polyanionic cellulose and combination thereof.

Advantageously the texturing agent comprises a carboxy methyl cellulose (CMC).

The molecular weight of said texturing agent is generally in the range 10000 to 1000000, preferably in the range 50000 to 750000, and the degree of polymerization is preferably in the range 100 to 5000.

Advantageously the degree of substitution is in the range 0.5-1.5 such as in the in the range 0.60-1.0.

In many embodiments according to the present invention the texturing agent or additional texturing agent is added in a concentration of 0.01 to 10% by weight, preferably in the range 0.02-5% by weight, more preferably 0.05 to 2 by weight, most preferably in the range 0.1 to 1% by weight.

The mixing time for mixing said ingredients is generally in the range from 10 seconds to about 3 hours, such as from 1 minute to 2 hours. Preferably said mixing time is in the range 10 minutes to 1 hour.

The feed mixture is withdrawn from the process of preparing said feed mixture and is converted by first pressurizing the feed mixture to an operating pressure for said conversion in the range 250 to 400 bar, and even more preferably in the range 275 bar to 350 bar such as in the range 300 to 350 bar. It should be understood that conversion process may comprise several of such processes for producing said feed mixture e.g. these subprocesses may be operated batch wise and feeding the continuous conversion process via a buffer tank.

The pressurization may be performed in one or more steps. Suitable pumps for pressurization include positive displacement pumps such as reciprocating or rotary vane or gear pumps. Examples of preferred pumps include rotary lobe pumps, progressing cavity pumps, rotary gear pumps, piston pumps, screw pumps, vane pumps and diaphragm pumps.

The pressurized and pre-treated feed mixture is subsequently heated to the reaction temperature for said conversion in one or more steps. The reaction temperature may according to an embodiment the present invention be in the range 280 to 450° C. such as in the range 330 to 430° C., preferably in the range 350 to 430° C. such as in the range 370 to 425° C., more preferred in the range 385 to 420° C. such as in the range 390 to 415° C.

The heating is preferably at least partly performed by recovery of heat from one or more of the process streams to be cooled such as the hot raw product stream being withdrawn from said conversion step to maximize the thermal efficiency of the process. This may according to a preferred embodiment of the present invention be performed by direct heat exchange between the incoming feed mixture and the outgoing raw product stream as indicated in FIG. 1. In an optional embodiment the heat exchange may be performed by indirect heat exchange with a heat transfer medium such as steam, hot oil or molten salt transferring heat from hot process streams to the cold process streams.

A further heating step using an external heat source is required to heat and trim the temperature of feed mixture to the desired operating temperature. This heating may be performed by direct heat exchange of the partly heated feed mixture with a heating fluid such as steam or with hot flue gas from a burner or furnace.

In accordance with the invention the steam may comprise steam from an external process such as hot low pressure steam from a turbine. The steam may be further heated by an external heat source before heat exchange with the partly heated feed mixture to obtain specific heating rates and/or to minimize the heat transfer surface area required.

In the embodiment of the present invention, wherein the heating fluid comprises hot flue gas from a burner, said burner may be a furnace comprising heat transfer surfaces for further heating said partly heated feed mixture or the hot gas may be transferred to an external heat exchanger for said heat exchange. In both cases it is greatly preferred that the fuel for said burner or furnace is at least partly comprised by combustible gases produced by the process. The co-combustion of such combustible gases produced by the process in said burner and/or furnace increases the overall thermal efficiency of the process and/or reduces waste streams from the process by destroying pollutants, whereby some objectives of the current invention are accomplished.

In another advantageous embodiment in accordance with the present invention said further heating of the partly heated feed mixture to the desired operating temperature for said conversion may comprise indirect heat exchange with a heat transfer medium such as hot oil or a molten salt. External heat may at least partly be transferred to said heat transfer medium in a burner and/or furnace. Said burner may advantageously comprise co-combustion of gas produced in the process, and/or be equipped with means for recirculation of flue gas in a similar manner as described above.

It is advantageous that said heating is not too slow and advantageously fast. Hence, in a particular preferred embodiment the heating rate in the temperature range 140° C. to 300° C. is preferably at least 50° C./min such as 75° C./min and preferably at least 100° C./min such as at least 150° C./min.

The residence time for said conversion to proceed at the desired operating pressure and temperature may according to the present invention be in the range 1 to 60 minutes such as in the range 1 to 30 minutes, and preferably the residence time is in the range 1 to 25 minutes such as a residence time in the range 2 to 20 minutes, and even more preferably said residence time is in the range 3 to 15 minutes such as in the range 4 to 10 minutes.

The process according to the present invention is preferably a continuous process, and may be performed in a substantially in a plug flow of the feed mixture. The flow velocities in pipes are according to an embodiment of the invention further selected so as to minimize sedimentation or precipitation of particles that may be suspended or formed during said conversion process e.g. by keeping at velocity in said pipes of at least 0.20 m/s such as at least 0.5 cm/s, and preferably in the range 0.2 to 5 m/s second such as 0.5 to 3 m/s.

The residence time needed may according to the present be obtained by applying one or more long tubes preferably vertically arranged and connected with bends designed to minimize dead zones that could cause settlement. Flow velocities in said reactor tubes should preferably be maintained within the above ranges to minimize that the risk of sedimentation and clogging of said tubular plug flow reactor(s).

Whereas embodiments of present invention typically allow for management of suspended particles without substantial sedimentation, precipitation or fouling even when processing feedstock having a high ash content, it may be beneficial to at least partly separate said particles from said fluid containing converted carbonaceous material while its hot, thereby e.g. reducing downstream separation needs. Suitable means for such particle separation include one or more gravimetric settling chambers, inline filters and/or hydrocyclones or combination thereof.

Subsequent to said second step of converting the fluid comprising converted carbonaceous material is cooled to a temperature in the range 25 to 150° C. and expanded to a pressure in the range 1-25 bar in a third step of cooling and expanding. Said cooling is preferably performed by heat exchange with said incoming feed mixture in one or more steps as described above.

The expansion in third step of cooling and expanding may be performed prior to a last step of cooling e.g. by cooling to a temperature in the range 100-200° C. such as 150° C. by direct heat exchange with the incoming feed mixture. This allows for a less expensive cooler for the last part of the cooling as this only requires operation at a pressure of 1-25 bar. A second step of said fluid comprising converted carbonaceous material may comprise cooling by preheating the feed mixture in said first step of preheating and/or for producing steam for export to e.g. an external process.

The cooled and expanded fluid containing converted carbonaceous material from said third step of cooling and expanding is subsequently lead to a fourth step of separating from said mixture at least a residual fraction and a fraction comprising said liquid hydrocarbon.

The fluid containing converted carbonaceous material may comprise liquid hydrocarbon product, a water phase containing water soluble organic compounds and salts, gas and suspended particles.

According to a preferred embodiment of the present invention said fourth step of separating comprises means for separating gas from said mixture such as a degasser and/or a multiphase gravimetric separator equipped with means for withdrawal of gas and/or comprising different liquid outlets for withdrawing different liquid streams such as a liquid hydrocarbon rich phase and/or a water rich phase and/or particle rich stream.

A preferred option comprises separation means for degassing and a at least coarse separation of said mixture into a liquid hydrocarbons rich stream and a residual fraction stream preferably after degassing. The gas from said degassing step is preferably fed to burner and/or furnace to supply heat to the process as described above.

The means for separating may comprise or further comprise centrifugation such as by centrifugation in one or more disc centrifuge(s) and/or basket centrifuge(s) for separation of said liquid hydrocarbons and/or water and/or suspended.

FIG. 1 further shows that the heating in said second step of converting comprises or further comprises heating by direct injection of an external heating medium such as a superheated supercritical fluid such as superheated steam and/or by addition of an oxidizing agent in a predefined amount to provide heat by partial combustion or partial oxidation of said carbonaceous material internally in the process.

The oxidizing agent may according to the present invention be selected from oxygen, oxygen enriched air, air or hydrogen peroxide and may according to the present invention be added in an amount so as to convert up to 25% of the energy contained in said feed mixture to heat such as up to 15% of the energy contained in said feed mixture, and preferably the amount of said oxidizing agent being added is controlled to convert up to 10% of the energy contained in said feed mixture such as up to 5% of the energy contained in said feed mixture.

The superheated supercritical fluid is in accordance with the present invention preferably at least partly generated within the process and reused. This may according to an embodiment of the present invention be performed by including one or more flashing steps during said third step cooling and expanding, condensing water from the vapour phase, and applying means for superheating and re-pressuring said vapour e.g. by superheating in an external furnace.

Figure 2:
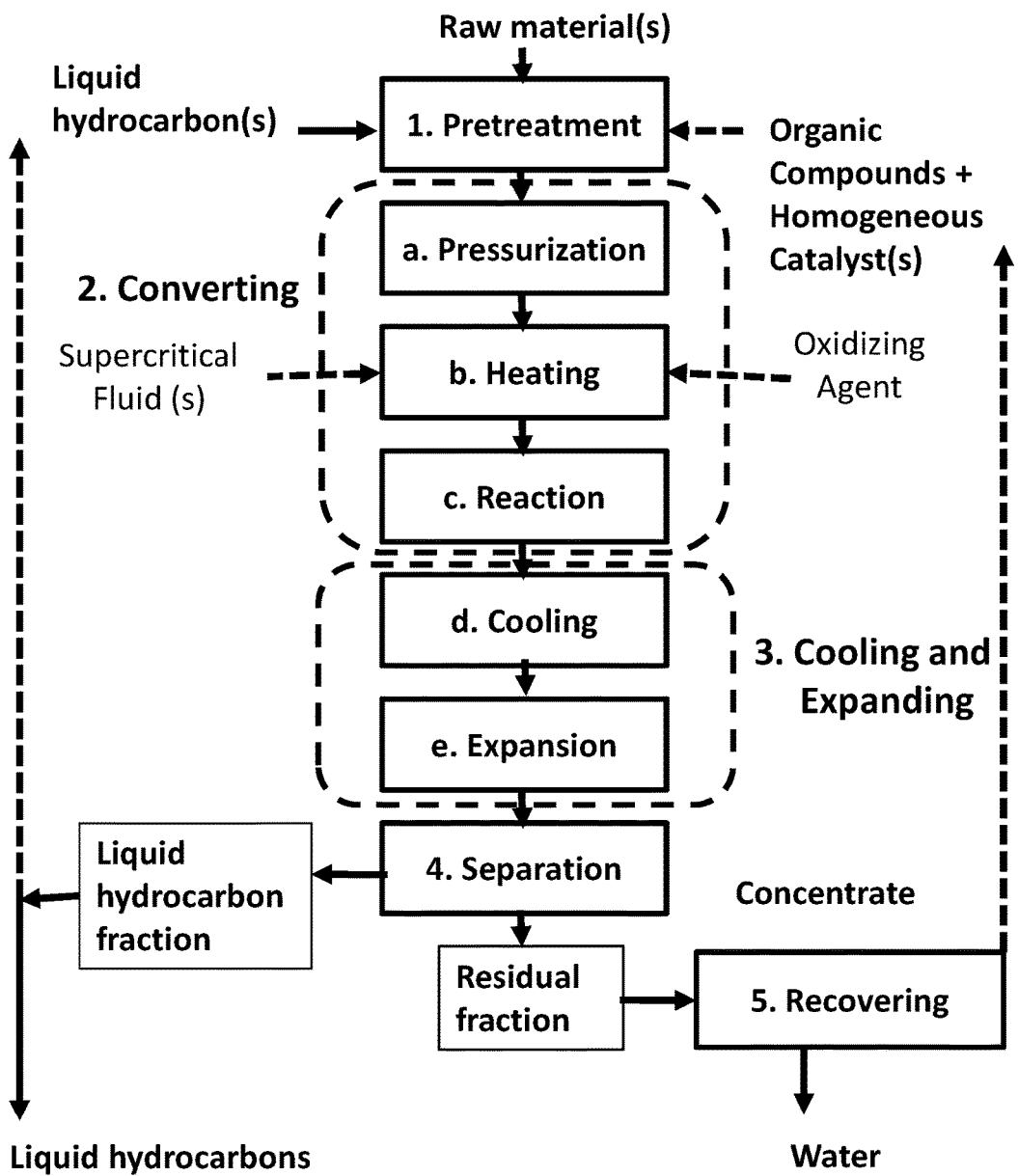
FIG. 2 shows a schematic diagram of a hydrothermal process for conversion of carbonaceous material according to the present invention comprising a fifth step of recovering substances from the residual fraction.

FIG. 2 shows a schematic drawing of an advantageous embodiment according to the present invention comprising a first step of pre-treating, a second step of converting, a third step of cooling and expanding, and a fourth step of separating the fluid comprising converted organic material at least into a fraction comprising liquid hydrocarbons and a residual fraction according to the embodiment described above further comprising a fifth step of recovering liquid hydrocarbon compounds and homogenous catalyst from said residual fraction.

The residual fraction according to the present invention comprises a water phase that may contain dissolved homogenous catalysts such as potassium and/or sodium. Whereas beneficial for the conversion the carbonaceous material such homogeneous catalysts are relatively expensive and may constitute a major operating cost. Further in many applications of the present invention between 10 to 30% of the energy may be contained in said carbonaceous material contained in said feed mixture is converted into water soluble organic compounds contained in said water phase. The presence of these liquid organic compounds in the water phase represent both a process loss reducing the thermal efficiency of the process, and put further requirements to purification of the water effluent from the process.

An advantageous embodiment of the present invention include a fifth step of recovering comprising at least partly recovering homogenous catalyst in the form of potassium and/or sodium and/or liquid organic compounds from said water phase in a concentrated form ("concentrate") and recycling said concentrate to said first step of pre-treating. Hence, such embodiment according to the present invention improves the process economy by reducing operating cost, improving energy efficiency of the overall process and increasing yield of said desired liquid hydrocarbons.

A preferred fifth step of recovering in accordance with the present invention comprises concentration by an evaporation technique. Said evaporation may be performed in a falling or rising film evaporator and may comprise a multi-effect evaporator comprising 2 or more stages. It is further preferred that at least the first evaporator is equipped with means for vapour compression such as mechanical vapour recompression (MVR) and/or thermal vapour recompression (TVR) or a combination thereof. In a preferred embodiment steam for heating and/or thermal recompression such as by thermal recompression is produced by the process and thereby reducing the energy requirements for said evaporation and the overall thermal efficiency of the process. The distillate from the evaporation step may after condensation be further treated in an absorber using an alkaline scrubbing agent such as sodium hydroxide to control the amount of water soluble organics in the water effluent from the evaporation step.

Many applications according to the present invention comprises concentrating water phase at least by a factor of 2 such as a concentration factor of at least 3 preferably said water phase is concentrated by at least a factor of 5 such as a concentration factor of at least 7 on a mass basis.

The amount of liquid organic compounds recovered from said water phase (residual fraction) in said concentrate in said fifth step of recovering and being recycled to said feed stock is according to an embodiment at least 80% of the water soluble organics in the put stream to said fifth step of recovering measured as the concentration of total organic carbon present in input water phase. Preferably at least 85% of the water soluble organics in said water phase is recovered, and even more preferably the amount of liquid organic compounds recovered from said water phase is at least 90% such as at least 95%.

Further the amount of homogenous catalyst in the form of potassium and/or sodium recovered from said water phase being fed to said fifth step of recovering is at least 90% such as at least 95% and preferably more than 99%.

The last step of said evaporator in said fifth step of recovering is according to a preferred embodiment of the present invention further equipped with means for condensing said vapour phase from said last evaporator stage in two or more steps of condensing having a decreasing condensation temperature so as to condense compounds having a boiling point lower than water in said second or third step of condensing. Alternatively said compounds may be condensed in the same step as water by selecting the condensation temperature so as to condense such compounds. Said condensation temperature in said last step of condensing may be selected to have a condensation temperature of 40 to 60° C., so as to condense compounds having a boiling point lower than water, and at the same time minimize the mixing of these lower boiling liquid organic compounds with the evaporated water. Hereby it is not only obtained that said compounds having a boiling point lower than water is recovered and may be recycled to the process, but also that the evaporated water are cleaned to a level where it in many applications may be directly used e.g. for irrigation or discharged e.g. to sewer.

The condensed water phase from said evaporation system according to the present invention may comprise organic compounds corresponding to a concentration of less than 0.01-5 g/l such as a TOC concentration of less than 0.1-2 g/l. The water phase may in many applications according to the present be clean enough for use as technical water internally or for irrigation purposes. Optionally a further polishing treatment may be performed.

The concentrate from said evaporation contains liquid organic compounds in the form of water soluble organics in a concentration of at least to 10% by weight such as at least 40% by weight; preferably up the concentration of water soluble organics is at least 30% by weight such as at least 40% by weight. The majority of said concentrate is recycled to said feed mixture preparation step along with homogeneous catalyst contained in the concentrate.

Figure 3:
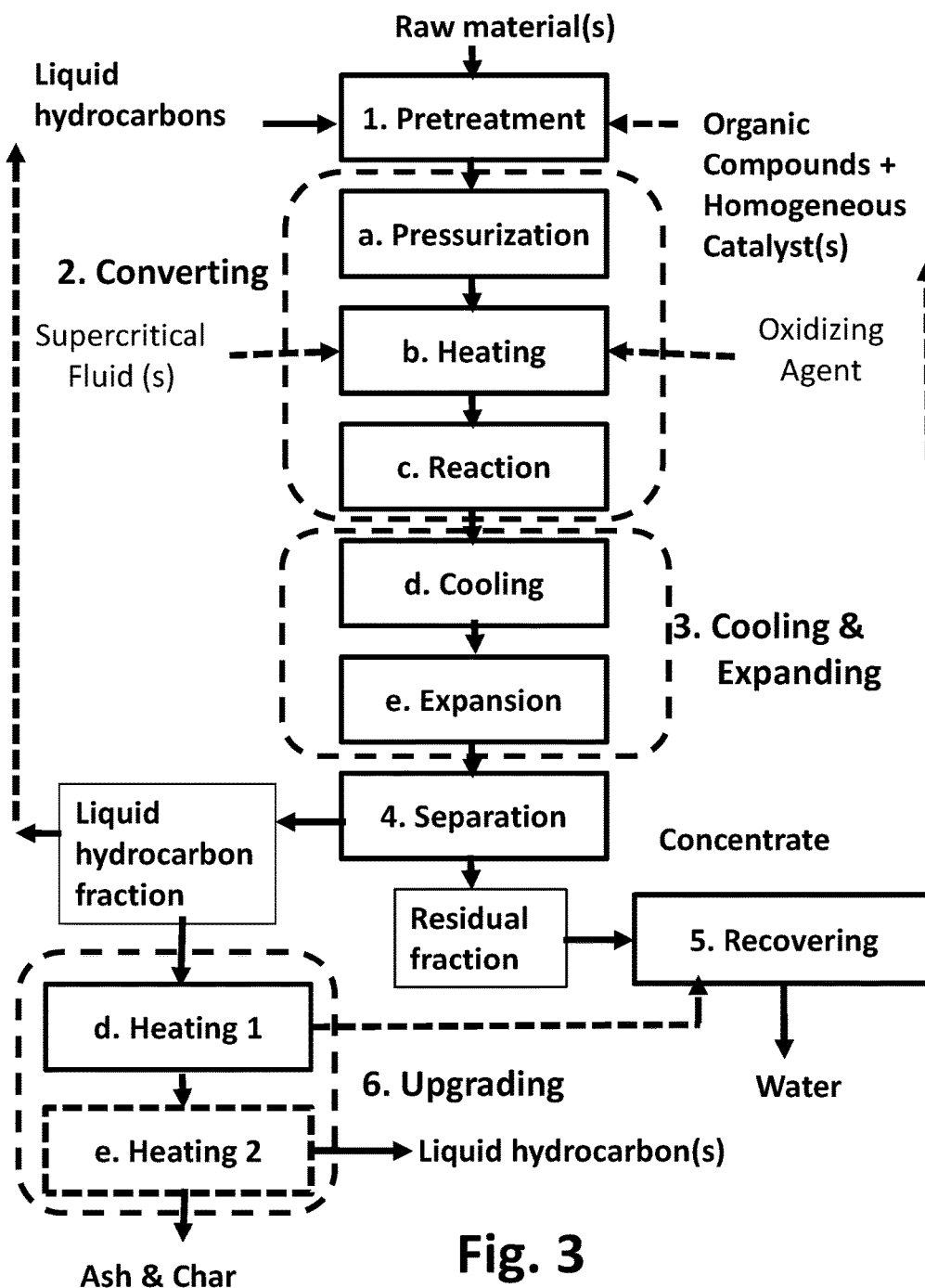
FIG. 3 shows a schematic diagram of a hydrothermal process for conversion of carbonaceous material comprising a 6$^{th}$ step of upgrading the liquid hydrocarbon fraction.

FIG. 3 shows an embodiment of the present invention further comprising a sixth step of upgrading the liquid hydrocarbon fraction by heating in one or more steps.

Depending on the specific feedstock, processing conditions and process configuration the liquid hydrocarbon fraction after said fourth step may comprise a crude oil, which may contain more or less water, more or less ash and salts, a relatively high acid number and/or high viscosity. The liquid hydrocarbon fraction may be of sufficient quality for direct use e.g. as a heavy fuel oil or coal substitute in industrial combustion applications. The liquid hydrocarbons may also be of sufficient quality for upgrading to transportation fuels like in a conventional large centralized refinery. However in many cases according to the present invention it is desirable to further upgrade the liquid hydrocarbon fraction so it has more and higher value direct applications.

Hence an embodiment of the present invention comprises the steps and features described and further a sixth step of upgrading said hydrocarbon fraction by hydrotreating. Said sixth step of upgrading is preferably performed by heating said liquid hydrocarbon fraction to a temperature in the range 300 to 500° C. such as heating to a temperature in the range 330 to 420° C. and preferably to a temperature in the range 350 to 400° C. such as in the range 360 to 390° C. at a pressure in the range 10 to 200 bar and contacting said heated liquid hydrocarbon fraction with hydrogen gas over a heterogeneous hydrotreating catalyst such as CoMo, NiMo, NiW, Pd or Pt on a carrier of Y-alumina, aluminosilicates, zeolites (X, Y, or modenite), titania, or zirconia, thereby producing at least one upgraded liquid hydrocarbon fraction and at least one residue fraction and at least one gas fraction and at least one fraction comprising water. The liquid hydrocarbon fraction may in a preferred embodiment be separated such as by filtering and/or fractionation so as to separate particles, water and/or heavy residues from the liquid hydrocarbon fraction prior to said hydrotreating. Heavy residues in this context is meant to be compounds having a boiling point of at least 450° C. such as a boiling point of at least 500° C.

The hydrogen gas for said hydrotreating may according to preferred embodiments of the present invention be at least partly produced by the process, and may comprise hydrocarbon gases such as C1-C6 hydrocarbons. A particularly preferred embodiment is where substantially all of said hydrogen gas is produced by the process.

The fraction comprising water is according to a preferred embodiment recycled to the fifth step of recovering such as by introducing it into and mixing it with the residual fraction from said fourth step of separating.

EXAMPLES

Example 1

A feed mixture was prepared by mixing 12.5 g of finely milled pellets from Aspen wood with 86.5 g of water and 1.0 g of potassium carbonate. The finely milled pellets from aspen wood was produced in a hammermill with a 250 micron screen. The finely milled pellets had a moisture content of 8.0% and an ash content of 0.4 wt %. The resulting slurry was transferred to a standard 50 ml syringe without needle (piston area approximately 1 cm$^2$, outlet hole/syringe (approximately 1 mm$^2$). The slurry could be squeezed out in a homogeneous stream without clogging when the piston was pressed directly after transfer to the syringe. The syringe was subsequently filled with the same feed mixture and the feed mixture was allowed to stand for 1 minute before pressing the pistion. Sedimentation of the feed mixture was visually observed before pressing the pistion. When pressing the piston the water was squeezed out of the feed mixture and a residual solid clog of dry matter that could not be pressed out of the syringe remained in the syringe.

Example 2

A feed mixture was prepared by mixing 18.75 g of finely milled pellets from Aspen wood with 83.5 g of water and 1.5 g of potassium carbonate. The resulting slurry was transferred to a standard 50 ml syringe without needle (piston area approximately 1 cm$^2$, outlet hole/syringe (approximately 1 mm$^2$). When pressing the piston the water was squeezed out of the feed mixture and a residual solid clog of dry matter that could not be pressed out of the syringe remained in the syringe.

Example 3 15 Wt % Rape Seed Oil and Water Soluble Organics

A feed mixture was prepared by mixing 18.75 g of finely milled pellets from Aspen wood, 15.0 g of rape seed oil, 65.75 g of water and 1.5 g of potassium carbonate. The resulting slurry was transferred to a standard 50 ml syringe without needle (piston area approximately 1 cm$^2$, outlet hole/syringe (approximately 1 mm$^2$). When pressing the piston the water was squeezed out of the feed mixture and a residual solid clog of dry matter that could not be pressed out of the syringe remained in the syringe.

Example 4 15 wt % with Recycle Oil

A feed mixture was prepared by mixing 18.75 g of finely milled pellets from Aspen wood with 15.0 g of recycle oil and 50 g of water with water soluble organics produced from the same mixture in a high pressure process at 312 bar and 403° C., 13.45 g of demineralized water and 1.5 g of potassium carbonate. The resulting slurry was transferred to a standard 50 ml syringe without needle (piston area approximately 1 cm$^2$, outlet hole/syringe (approximately 1 mm$^2$). When pressing the piston the water the feed mixture flowed out of the syringe as a homogeneous mixture.

Example 4 20 wt % with Recycle Oil

A feed mixture was prepared by mixing 25.0 kg of finely milled pellets from Aspen wood with 20.0 kg of recycle oil from a previous run and 42.24 kg of water with water soluble organics produced from the same mixture in a high pressure process at 312 bar and 403° C., 10.56 kg of demineralized water and 2.2 kg of potassium carbonate. The resulting slurry was transferred to a standard 50 ml syringe without needle (piston area approximately 1 cm$^2$, outlet hole/syringe (approximately 1 mm$^2$). When pressing the piston the water was squeezed out of the feed mixture and a residual solid clog of dry matter that could not be pressed out of the syringe remained in the syringe.

Example 5 20 Wt % with Guar Gum

A feed mixture was prepared by mixing 25.0 kg of finely milled pellets from Aspen wood with 20.0 kg of recycle oil and 42.94 kg of water with water soluble organics produced from the same mixture in a high pressure process at 312 bar and 403° C., 2.2 kg of potassium carbonate, and 0.300 kg Guar gum premixed in 10.56 kg demineralized water. The resulting slurry was transferred to a standard 50 ml syringe without needle (piston area approximately 1 cm$^2$, outlet hole/syringe (approximately 1 mm$^2$). When pressing the piston the water the feed mixture flowed out of the syringe as a homogeneous mixture.

Example 6 Conversion of 20 wt % with Guar Gum

The feed mixture described in example 5 was pressurized to 318 bar and heated to 410° C. in an induction heater before entering into the reactor. The residence time in the reactor was 10 minutes. The outlet temperature from the reactor was 388° C. The resulting product mixture was cooled, filtered and depressurized. The gas was separated from the remaining product and the remaining product was separated by gravimetric separation. After approximately 3 hours of operation a pressure drop started to build up over the reactor. After 5 hours of operation the pressure drop had increased to 10 bar and the feed was switched to water, the plant was shut down. The pressure drop was found to be caused by char formation in the reactor.

Example 7 27.5 Wt % Mixture of Peat and Wood

A feed mixture was prepared by mixing 14.95 kg of finely milled pellets from Aspen wood (8% moisture) and 35.25 kg peat moss (61% moisture) with 27.5 kg of recycle oil and 15.0 kg of water with water soluble organics produced from the same mixture in a high pressure process at 312 bar and 403° C., 5.1 kg of demineralized water and 2.2 kg of potassium carbonate. The resulting slurry was transferred to a standard 50 ml syringe without needle (piston area approximately 1 cm$^2$, outlet hole of syringe (approximately 1 mm$^2$). When pressing the piston the water the feed mixture flowed out of the syringe as a homogeneous mixture.

Example 8 27.5 wt % Mixture of Peat and Wood with Guar Gum

A feed mixture was prepared by mixing 15.0 kg of finely milled pellets from Aspen wood (8% moisture) and 35.0 kg peat moss (61% moisture) with 27.5 kg of recycle oil and 15.0 kg of water with water soluble organics produced from the same mixture in a high pressure process at 312 bar and 403° C., 2.2 kg of potassium carbonate and 0.3 kg guar gum premixed in 5.1 kg demineralized water. The resulting slurry was transferred to a standard 50 ml syringe without needle (piston area approximately 1 cm$^2$, outlet hole of syringe (approximately 1 mm$^2$). When pressing the piston the water the feed mixture flowed out of the syringe as a homogeneous mixture.

Example 9 20 Wt % with CMC

A feed mixture was prepared by mixing 25.0 kg of finely milled pellets from Aspen wood with 20.0 kg of recycle oil and 43.0 kg of water with water soluble organics produced from the same mixture in a high pressure process at 312 bar and 403° C., 2.2 kg of potassium carbonate and 0.600 kg Caboxy Methyl Cellulose (CMC) premixed in 10.3 kg demineralized water. The resulting feed slurry was transferred to a standard 50 ml syringe without needle (piston area approximately 1 cm$^2$, outlet hole of syringe (approximately 1 mm$^2$). When pressing the piston the water the feed mixture flowed out of the syringe as a homogeneous mixture.

Example 10 Conversion of Feed Mixture with Wood & Peat

The feed mixture described in example 7 was pressurized to 310 bar and heated to 398° C. in an induction heater before entering into the reactor. The residence time in the reactor was 10 minutes. The outlet temperature from the reactor was 383° C. The resulting product mixture was cooled, filtered and depressurized. The gas was separated from the remaining product and the remaining product was separated by gravimetric separation. The conversion process to liquid hydrocarbons was operated for 10 hours without any measurable pressure drop over the reactor.

Example 11 Conversion of Feed Mixture with Wood & Peat & Guar Gum

The feed mixture described in example 8 was pressurized to 310 bar and heated to 396° C. in an induction heater before entering into the reactor. The residence time in the reactor was 10 minutes. The outlet temperature from the reactor was 382° C. The resulting product mixture was cooled, filtered and depressurized. The gas was separated from the remaining product and the remaining product was separated by gravimetric separation. After approximately 1.5 hours of operation a pressure drop started to build up over the reactor. The pressure drop was found to be caused by char formation in the reactor.

Example 12 Conversion of Feed Mixture Comprising 20 wt % Wood and CMC

The feed mixture described in example 9 was pressurized to 314 bar and heated to 401° C. in an induction heater before entering into the reactor. The residence time in the reactor was 10 minutes. The outlet temperature from the reactor was 386° C. The resulting product mixture was cooled, filtered and depressurized. The gas was separated from the remaining product and the remaining product was separated by gravimetric separation. No measurable pressure drop was observed during 10 hours of operation.

Example 13 Conversion of Feed Mixtures Comprising 22.8 wt % Wood and CMC with Different Amount of Recycled Oil 100 kg of two feed mixtures was prepared. Both feed mixtures had 23.0% by weight (25 kg finely milled aspen wood as received), 0.6 wt % of CMC (0.6 kg) premixed in 10.3 kg demineralized water (reverse osmosis) and 2.2 wt % (2.2 kg) of potassium carbonate. Feed mixture A was prepared by adding 20.0 wt % of recycled oil (20.0 kg liquid hydrocarbon product) and 41.9 wt % (41.9 kg) of recycled water with water soluble organics and dissolved potassium homogeneous catalyst. Feed mixture B was prepared by adding 30.0 wt % of recycled oil (35.0 kg liquid hydrocarbon product) and 26.9 wt % (26.9 kg) of water with water soluble organics and dissolved potassium homogeneous catalysts from a previous run. Both feed mixtures were tested by the syringe test described above and both flowed out of the syringe as a homogeneous mixture.

The feed mixtures were both converted in a continuous process by pressurizing to a pressure in the range 320-325 bars, and heating the feed mixture to a temperature in the range 402-409° C. Both feed mixtures resulted in an oil yield from the wood of approximately 42% (dry ash free oil yield from wood=Total dry ash free oil yield−Total dry ash free oil added). However, whereas feed mixture A resulted in an oil which were fluidic and relatively low viscosity at room temperature, and a relatively low viscosity and fluidic oil, feed mixture B resulted in a thick, viscous oil at room temperature. This observation indicates that an optimum feed composition e.g. a certain amount of water is required for the desired reactions to proceed.

The invention claimed is:

1. A process for producing hydrocarbons comprising:
combining one or more carbonaceous feedstocks with water and an additional component of a texturing agent to obtain a feed mixture;
pressurizing said feed mixture to a pressure substantially in a range of 150 to 375 bar; and
heating the pressurized feed mixture to a temperature substantially in a range of 300 to 430° C.,
wherein the texturing agent is adapted to stabilize the feed mixture to prevent separation and further to maintain the feed mixture as a homogenous mixture during the pressurizing step,
wherein the texturing agent is adapted to be converted or degraded during the hydrocarbon production process, and
wherein the texturing agent comprises a derivative of a cellulosic material and is selected from microcrystalline cellulose (MCC), nanocrystalline cellulose (NCC), polyanionic cellulose (PAC), a derivative of methylcellulose, and a combination thereof.

2. A process according to claim 1, wherein said pressurizing step pressurizes said feed mixture to a pressure of at least 218 bars.

3. A process according to claim 1, wherein the heating step heats the pressurized feed mixture to a temperature of at least 350° C.

4. A process according to claim 1, wherein said one or more carbonaceous material comprises lignocellulosic material.

5. A process according to claim 1, wherein the texturing agent is added in a concentration of 1-50% by weight of total dry matter content of said one or more carbonaceous feedstocks.

6. A process according to claim 1, further comprising treating part of said one or more carbonaceous feedstocks with a base at a temperature in the range of 150 to 230° C. to produce a pulp.

7. A process according to claim 6, wherein the base is selected from sodium hydroxide, potassium hydroxide, potassium carbonate, ammonia, and a combination thereof.

8. A process according to claim 7, wherein the concentration of said base added to produce said pulp is in the range 5 to 30 percent by weight.

9. A process according to claim 6, further comprising adding water soluble organics to the part of said one or more carbonaceous feedstocks before or during the treatment of part of said one or more carbonaceous feedstocks.

10. A process according to claim 9, wherein said water soluble organics comprise at least one of the following: an alcohol having a carbon chain length of 1-6, a phenol or phenol derivative, a catechol, a ketone having a chain length of 1-6, and organic acids having a chain length of 1-6.

11. A process according to claim 10, wherein said water soluble organics comprise glycerine, said texturing agent being different from said water soluble organics.

12. A process according to claim 10, wherein said water soluble organics are present in a concentration in the range 5-40% by weight.

13. A process according to claim 6, wherein the part of the one or more carbonaceous feedstocks being treated is in the range 20% to 80% by weight of the total carbonaceous feedstock in the feed mixture.

14. A process according to claim 1, wherein the texturing agent is a derivative of methylcellulose selected from carboxymethylcellulose (CMC) and hydroxypropyl methylcellulose, and a combination thereof.

15. A process according to claim 14, where the texturing agent comprises a carboxy methyl cellulose (CMC).

16. A process according to claim 1, wherein the molecular weight of said texturing agent is in the range 10000 to 1000000.

17. A feed mixture according to claim 1, wherein a degree of polymerization of said texturing agent is in the range 100 to 5000 repeat units.

18. A process according to claim 1, wherein a degree of substitution of said texturing agent is in the range 0.5-1.5.

19. A process according to claim 1, wherein the texturing agent is added in a concentration of 0.01 to 10% by weight.

20. A process according to claim 1, wherein a concentration of water in the feed mixture is less than 75% by weight.

21. A process according to claim 1, wherein a concentration of water in the feed mixture is at least 25% by weight.

22. A process according to claim 1, wherein a concentration of water in the feed mixture is in the range of 15 to 75% t.

23. A process according to claim 1, wherein the feed mixture includes at least one liquid organic compound that is a desired product that is at least partly produced within the process, wherein the concentration of said liquid organic compound contained in the feed mixture is at least 10% by weight.

24. A process according to claim 23, wherein said liquid organic compound comprises hydrocarbons produced by the process.

25. A process according to claim 24, wherein the concentrations of said hydrocarbons produced by the process is at least 10% by weight.

26. A process according to claim 23, wherein said liquid organic compound comprises water soluble organics produced by the process.

27. A process according to claim 26, wherein the concentration of said water soluble organics is in a concentration of at least 2% by weight.

28. A process according to claim 26, wherein the concentration of said water soluble organics is in the range 2 to 40% by weight.

29. A process according to claim 23, wherein the ratio of weight of said one or more liquid organic compounds to the dry weight of carbonaceous material in said feed mixture is in the range 0.1 to 2.0.

30. A process according to claim 1, wherein the feed mixture provided contains at least one homogeneous catalyst in the form of a compound of potassium and/or sodium so as to ensure a total concentration of potassium and sodium of at least 0.5% by weight.

31. A process according to claim 30, wherein the concentration of the homogeneous catalysts and base in the feed mixture are controlled so as to maintain a pH in the range of 6.5-14 at any location of the conversion process of said one or more carbonaceous materials.

32. A process according to claim 1, wherein the pH of said feed mixture is in the range of 7-14.

33. A process according to claim 1, wherein the feed mixture comprises a dry solid content of carbonaceous material in the range 15 to 60% dry matter by weight.

34. A process according to claim 1, wherein the feed mixture comprises a dry solid content of carbonaceous material that is in a concentration of at least 15% dry matter by weight.

35. A process according to claim 1, wherein the feed mixture comprises a dry solid content of carbonaceous material in the range 15 to 50% by weight.

36. A process according to claim 1, wherein the feed mixture comprises carbonaceous particles with a particle size of maximum 5 mm.

37. A process according to claim 1, wherein the viscosity of said feed mixture is in the range of 500 to 100000 cP at room temperature.

38. A process according to claim 1,
wherein the feed mixture is further provided with a homogenous catalysts in the form of a compound of potassium and/or sodium, and a desired content of liquid organic compound, and
wherein the one or more carbonaceous feedstocks, the water, the texturing agent, the homogeneous catalyst, and the liquid organic compound is mixed for a sufficient time to provide a homogeneous feed mixture.

* * * * *